US012167236B2

(12) United States Patent
Sullivan et al.

(10) Patent No.: US 12,167,236 B2
(45) Date of Patent: Dec. 10, 2024

(54) REMOTE MANAGEMENT OF HARDWARE SECURITY MODULES

(71) Applicant: INTERNATIONAL BUSINESS MACHINES CORPORATION, Armonk, NY (US)

(72) Inventors: Garry Joseph Sullivan, Rochester, MN (US); James Richard Coon, Rochester, MN (US); Michael Joseph Jordan, Woodstock, NY (US); Michael J. Young, Poughkeepsie, NY (US); Jessica Doherty, Poughkeepsie, NY (US); Christopher V. DeRobertis, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 17/118,837

(22) Filed: Dec. 11, 2020

(65) Prior Publication Data

US 2022/0191693 A1 Jun. 16, 2022

(51) Int. Cl.
*H04W 12/0471* (2021.01)
*H04L 9/32* (2006.01)
*H04W 12/108* (2021.01)

(52) U.S. Cl.
CPC ....... *H04W 12/0471* (2021.01); *H04L 9/3268* (2013.01); *H04W 12/108* (2021.01)

(58) Field of Classification Search
CPC ............ H04W 12/0471; H04W 12/108; H04L 9/3268
See application file for complete search history.

(56) References Cited

U.S. PATENT DOCUMENTS 9,037,865 B1 * 5/2015 Gopalakrishna ..... G06Q 20/363
 713/184
9,331,988 B2 5/2016 Ponsini
(Continued)

OTHER PUBLICATIONS

IP.com, "A Practical Code Sigining Server for the Enterprise", An IP.com Prior Art Database Technical Disclosure, IPCOM000236621D, May 6, 2014, pp. 1-11.
Sayler, "Custos: A Flexibly Secure Key-Value Storage Platform", B.S.E.E., Tufts University, 2011, 112 pages.
International Search Report and Written Opinion for International Appl. No. PCT/EP2021/084143; International Filing Date: Dec. 3, 2021; Date of Mailing: Feb. 25, 2022; 13 pages.
(Continued)

*Primary Examiner* — Alexander Lagor
*Assistant Examiner* — Zoha Piyadehghibi Tafaghodi
(74) *Attorney, Agent, or Firm* — Cantor Colburn LLP; Edward Wixted

(57) ABSTRACT

A computer-implemented method for remote management of hardware security modules (HSMs) includes receiving a command request from a mobile device. The command request includes an encrypted key part and an encrypted signing key. The HSM decrypts the command request using a key associated with a security zone of the mobile device. The HSM decrypts the encrypted key part and the encrypted signing key. Decrypting the encrypted key part and the encrypted signing key includes using the key associated with the security zone of the mobile device and a key associated with a remote administrator associated with the mobile device. A command is generated for a domain with a target HSM. The command is generated using the decrypted key part and the decrypted signing key. The command is transmitted to the domain for execution by the target HSM. Various other methods, systems, and computer-readable media are also disclosed.

18 Claims, 6 Drawing Sheets

(56) References Cited

U.S. PATENT DOCUMENTS

| | | | |
|---|---|---|---|
| 9,660,970 | B1 | 5/2017 | Rubin et al. |
| 10,362,032 | B2 | 7/2019 | Fitzgerald et al. |
| 2006/0072762 | A1* | 4/2006 | Buer .................. H04L 63/0428 380/277 |
| 2011/0314515 | A1 | 12/2011 | Hernoud et al. |
| 2012/0213370 | A1* | 8/2012 | Moskovics ............. G06F 21/57 380/278 |
| 2016/0344710 | A1* | 11/2016 | Khan .................... H04L 63/061 |
| 2017/0222806 | A1* | 8/2017 | Dao ...................... H04L 9/0897 |
| 2018/0176013 | A1 | 6/2018 | Cheng et al. |
| 2019/0028281 | A1* | 1/2019 | Turissini ................. G06F 21/57 |
| 2019/0132299 | A1* | 5/2019 | Tucker .............. H04W 12/0431 |
| 2020/0021567 | A1* | 1/2020 | Salgaonkar ............... H04L 9/14 |
| 2020/0195434 | A1 | 6/2020 | Bereza Junior et al. |

OTHER PUBLICATIONS

"Ciphertrust Cloud Key Manager", Thales Trusted Cyber Technologies, https://www.thalestct.com/Solutions/Enterprise-Security/crypto-key-management/keymanagement/cckm/index.html, (Retrieved: May 16, 2024), 7 pages.

"Futurex", https://www.futurex.com/products/category/remote-andcentralized-management, (Retrieved: May 16, 2024), 7 pages.

"PrivaKey", www.privakey.com, (Retrieved: May 16, 2024), 5 pages.

"Ultra", https://www.ultra-electronics.com/uploads/ats/rcms_17-s-0428_high%20res.pdf, (Retrieved: May 16, 2024) 7 pages.

\* cited by examiner

REMOTE MANAGEMENT OF HARDWARE SECURITY MODULES

BACKGROUND

The present invention relates generally to cryptography, and more particularly to remote management of hardware security modules.

Computing systems can utilize different data security measures to protect data from unauthorized access. For example, a hardware security module (HSM) is a computing device and associated software that provides cryptographic functions to safeguard and manage cryptographic keys, which include encryption and decryption functions for digital signatures, strong authentication, and other cryptographic functions. HSMs can be in the form of physical plug-in cards or external computing devices connected or attached directly to a secure computing device or network server.

Existing techniques for HSM management solutions utilize dual control as well as other security techniques to ensure protection of data. For example, HSM management solutions can require multiple administrators that have smart cards containing key parts of a master key for an HSM to assemble in a physical secure space at the same time and present their smart cards containing their respective key parts to the system to configure HSMs. However, in situations where the administrators are not able to congregate in the same physical secure space at the same time, HSM management can be impractical and impede needed processes. For example, if one or more administrators cannot be in the physical space to present their smart card containing their respective key part, the HSM cannot be configured because all of the key parts necessary to form the master key are not present. This can occur if everyone must work from home, one or more administrators are physically unable to travel to the secure space, or other similar impediment that prevents all of the required administrators to be physically present in the secure space.

Conventional techniques for managing HSMs remotely have raised concerns about security surrounding the shared secrets needed by remote administrators and the authenticity of requests from a legitimate remote administrator. Shared secrets are pieces of data known only to the parties involved, in a secure communication. The remote administrators of a system need to utilize shared secrets for managing the HSM outside of the secure environment. One security concern stemming from existing techniques for HSM management includes how to securely transport shared secrets to and from a remote administrator. In some examples, a connection between a mobile device and a server can be compromised and the shared secrets may be intercepted by unauthorized users, thus compromising the security of the shared secret.

Some existing HSM management solutions enable a shared secret to be generated outside of a secure environment. In some cases, an HSM management system permits end-users or remote administrators to generate their own shared secrets using their own identity or information about the mobile device. A shared secret generated outside of the secure environment by a remote administrator may be vulnerable to exploitation if an attacker is able to access information used to generate the shared secret (e.g., user identity, mobile device information, etc.) and decrypt or otherwise obtain the shared secret. Such systems may be subverted if an attacker has collected sufficient information about the user or has access to their device, which can render the system vulnerable to attack.

In some existing HSM management solutions, shared secrets may not be sufficiently protected outside the secure environment when held by a remote administrator. For example, the shared secret can be unencrypted by the mobile device and stored on the mobile device in an unencrypted state. If an unauthorized user accesses the mobile device, they may be able to obtain the unprotected shared secret, thus making the system vulnerable to access by an unauthorized user.

In some existing HSM management solutions, administrative requests received from a remote administrator may not be valid or authentic. An attacker may clone a device controlled by the remote administrator or access the device without the knowledge of the remote administrator and attempt to access the system. Such requests may appear to be valid or authentic and provide an unauthorized user with access to the system.

SUMMARY

Embodiments of the present invention are directed to remotely managing hardware security modules (HSMs). A non-limiting example of a computer-implemented method can include receiving, by a processor of a computing device, a command request from a mobile device, the command request comprising an encrypted key part and an encrypted signing key. An HSM decrypts the command request using a key associated with a security zone of the mobile device. The HSM decrypts the encrypted key part and the encrypted signing key to generate a decrypted key part and a decrypted signing key. Decrypting the encrypted key part and the encrypted signing key includes using the key associated with the security zone of the mobile device and a key associated with a remote administrator associated with the mobile device. A command is generated for a domain with a target HSM and based on the command request. The command is generated using the decrypted key part and the decrypted signing key. The command is transmitted to the domain for execution by the target HSM.

One or more embodiments of the present invention are directed to a system for remotely managing HSMs. A non-limiting example of the system includes a memory having computer-readable instructions and one or more processors for executing the computer-readable instructions. The computer-readable instructions may implement the above method.

One or more embodiments of the present invention are directed to a computer-program product for remotely managing HSMs, the computer-program product including a computer-readable storage medium having program instructions embodied therewith. The program instructions are executable by a processor to cause the processor to perform the above method.

Thus, advantageously, one or more embodiments of the present invention securely manages the shared secrets used to remotely manage HSMs. This can allow the remote administrators to perform HSM management without having to assemble in one location while ensuring the shared secrets remain protected.

Additionally, or alternatively to the above, the command request can further include an encrypted logon key associated with the remote administrator and the computer-implemented method further includes the HSM decrypting the encrypted logon key to generate a decrypted logon key. Decrypting the encrypted logon key includes using the key associated with the security zone of the mobile device and the key associated with the remote administrator associated with the mobile device. The decrypted logon key is transmitted with the command to the domain. Thus advantageously, the logon key can be transmitted with the command to the domain.

Additionally, or alternatively to the above, a second command request from a second mobile device can be received. The second command request can include a second encrypted key part and a second encrypted signing key. The HSM decrypts the second command request using the key associated with the security zone of the mobile device. The HSM decrypts the second encrypted key part and the second encrypted signing key to generate a second decrypted key part and a second decrypted signing key. Decrypting the second encrypted key part and the second encrypted signing key includes using the key associated with the security zone and a different key associated with a different remote administrator associated with the second mobile device. A second command can be generated for the domain with the target HSM using the second decrypted key part and the second decrypted signing key. The second command can be transmitted to the domain. Thus advantageously, multiple remote administrators with different key parts can remotely manage HSMs without having to assemble in one location while ensuring the shared secrets remain protected.

Additionally, or alternatively to the above, the decrypted key part and the second decrypted key part are a part of a master key associated with the target HSM of the domain. Thus advantageously, HSMs can be managed using dual controls by different administrators using different key parts that are part of a master key for an HSM Additionally, or alternatively to the above, the mobile device can be provisioned by enrolling the mobile device in the security zone and associating the mobile device with the remote administrator. Thus advantageously, the mobile device used to remotely manage HSMs are configured to ensure protection of the shared secrets used by the system.

Additionally, or alternatively to the above, the command can be signed using the decrypted signing key prior to the transmitting the command to the domain for execution by the target HSM. Thus advantageously, the command to remotely manage an HSM is protected by an additional layer of security during transmission to the domain.

Additionally, or alternatively to the above, a message can be transmitted to the mobile device based on results received from the domain. Thus advantageously, the remote administrator is updated with the results of the command received from the domain.

Embodiments of the present invention are directed to remotely manage HSMs. A non-limiting example of a computer-implemented method includes receiving, by a processor of a computing device, from a mobile device associated with a remote administrator, a load key request that includes an encrypted key part and an encrypted signing key. The load key request from the mobile device can be validated. The encrypted key part and the encrypted signing key can be decrypted to generate a decrypted key part and a decrypted signing key. Decrypting the encrypted key part and the encrypted signing key can include using a private key corresponding to a public key of a certificate authority (CA) certificate for a security zone and a private key corresponding to a public key of a CA certificate of a profile of the remote administrator. A load key command can be built for a domain designated by the load key request. The load key command can include the decrypted key part and is signed using the decrypted signing key. The load key command can be transmitted to the domain for execution by a target hardware security module (HSM) of the domain.

Thus, advantageously, one or more embodiments of the present invention securely manages the shared secrets used to remotely manage HSMs. This can allow the remote administrators to perform HSM management without having to assemble in one location while ensuring the shared secrets remain protected.

Additionally, or alternatively to the above, the load key request is encrypted using the public key of the CA certificate for the security zone and validating the load key request includes decrypting the load key request using the private key corresponding to the public key of the CA certificate for the security zone. Thus advantageously, the load key request is encrypted by the mobile device to ensure the shared secret is protected during the transmission of the request to the system.

Embodiments of the present invention are directed to remotely managing HSMs. A non-limiting example of a computer-implemented method can include receiving, by a processor of a secure computing device from a mobile device associated with a remote administrator, an encrypted hardware security module (HSM) command request that includes an encrypted key part and an encrypted signing key. The encrypted HSM command request from the mobile device can be decrypted. An HSM of the secure computing device decrypts the encrypted key part and the encrypted signing key to generate a decrypted key part and a decrypted signing key. An HSM command corresponding to the encrypted HSM command request for a designated domain can be generated based at least in part on the decrypted key part and the decrypted signing key. The HSM command can be transmitted to the designated domain for execution by a target HSM of the designated domain.

Thus, advantageously, one or more embodiments of the present invention securely manages the shared secrets used to remotely manage HSMs. This can allow the remote administrators to perform HSM management without having to assemble in one location while ensuring the shared secrets remain protected.

Additionally, or alternatively to the above, the load key request is encrypted using the public key of the CA certificate for the security zone and validating the load key request includes decrypting the load key request using the private key corresponding to the public key of the CA certificate for the security zone. Thus advantageously, the load key request is encrypted by the mobile device to ensure the shared secret is protected during the transmission of the request to the system.

Additionally, or alternatively to the above, a message can be transmitted to the mobile device based on results received from the designated domain. Thus advantageously, the remote administrator is updated with the results of the command received from the domain.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
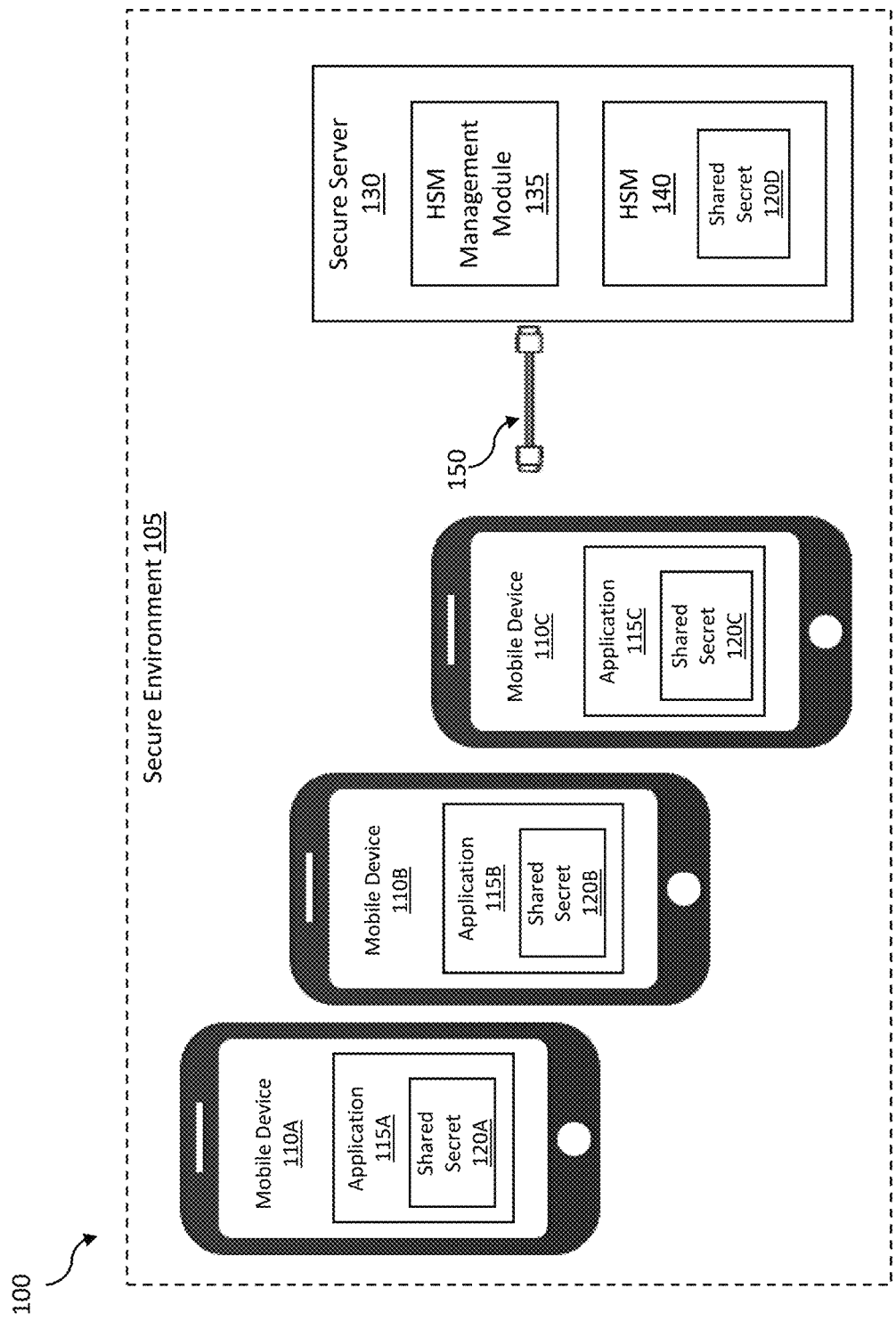
FIG. 1 is a schematic diagram illustrating mobile device provisioning for remote management of hardware security modules in accordance with one or more example embodiments.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Example embodiments of the present invention relate to, among other things, systems, methods, computer-readable media, techniques, and methodologies for remote management of hardware security modules (HSMs). Conventional approaches for remotely managing HSMs raise concerns about the security of the shared secrets needed by remote administrators and the authenticity of requests from a remote administrator. Existing techniques for managing HSMs typically require administrators to assemble in the same physical space at the same time to ensure adherence to standards and regulations that require HSMs to be managed using compliant-level management techniques. However, such techniques are impractical in circumstances where the administrators are physically unable to assemble in a single location.

One or more embodiments of the present invention are directed to remote HSM management, where master keys for HSMs are separated into key parts, stored in protected storage, and distributed to different remote administrators securely in a protected environment. Administrators are able to remotely manage HSMs while adhering to dual control requirements without having to physically assemble in the same physical secure space. The shared secrets are securely distributed while ensuring that requests received by the system from the administrators are authenticated to ensure the requests are coming from authorized administrators and that their mobile devices have not been compromised.

In some embodiments, a secure device, such as a secure server, is located in a secure environment. The secure environment is a secure location, such as a secure room or floor in building with limited access, where the secure device used to support remote HSM management is located. The secure device executes an application, such as a web application, to communicate with remotely located mobile devices outside of the secure environment for remote HSM management. Mobile devices, such as smartphones, are provisioned in the secure environment. Mobile devices are enrolled in a security zone and assigned to a remote administrator. Shared secrets used for HSM management are loaded onto the provisioned mobile device while in the secure environment. The shared secrets can include key parts, which are a component of a master key used by a designated HSM. The shared secrets are encrypted in the secure environment prior to being transferred to the mobile device, ensuring that the shared secrets on the mobile device are secure and unable to be decrypted by the user of the device or by anyone if the security of the mobile device has been comprised.

The remote administrators can take the mobile devices outside of the secure environment and use the them for remote HSM management. For example, while outside the secure environment, the remote administrator can open an application on their mobile device and authenticate themselves, such as by using multi-factor authentication. The remote administrator selects an HSM from a list of HSMs to be configured and selects a command to run on a target HSM of a designated domain. The remote administrator selects the needed shared secrets (e.g., loaded onto the mobile device during provisioning), such as a key part and/or signing key, which have previously been encrypted in the secure environment. The application builds a request using the selections of the remote administrator and encrypts the request with a public key in the remote administrator's certificate authority (CA) certificate. The encrypted request is transmitted to the secure device in the secure environment.

The secure device receives the encrypted requests from the mobile devices of the remote administrators. The secure device validates the requests and builds HSM commands using information from the respective requests received from the mobile devices of the remote administrators. Each HSM command is signed using a signing key obtained from a respective request and transmitted to the domain designated by the respective request. The command is executed by the target HSM of the designated domain. The target HSM will receive requests from all designated remote administrators and can assemble the key parts from each of the remote administrators until a master key is formed using the collected key parts. The HSM command is executed by the target HSM upon completion of the master key. The results of the command executed by the target HSM are transmitted back to the secure device. The secure device can generate a message indicative of the results received from the domain and transmit the message to the mobile device. The systems and methods described herein provide the ability to remotely manage HSMs while adhering to the various standards and regulations using compliant-level management techniques such as dual control.

A security concern stemming from existing techniques for HSM management is how to securely transport shared secrets to and from a remote administrator. In some examples, a connection between a mobile device and a server can be compromised and the shared secrets may be intercepted by unintended recipients, thus compromising the security of the shared secret. One or more embodiments of the present invention facilitate generation of shared secrets by an HSM of a secure device located in a secure environment. The shared secret can be doubly encrypted. For example, the shared secret, such as a key part, can be encrypted using the shared secret for the security zone of the mobile device and encrypted using a shared secret associated with a specific remote administrator. The doubly encrypted shared secret can then be loaded onto a provisioned mobile device used by a remote administrator for remote management of HSMs. The doubly encrypted shared secret generated in by the HSM in the secure environment is never decrypted while outside of the secure environment. When the remote administrator remotely manages an HSM, they can select the doubly encrypted shared secret to include in a command request transmitted to the secure device. Thus, even if the doubly encrypted shared secret is intercepted, it cannot be decrypted by an unauthorized user or used to remotely manage HSMs unless the mobile device from which it is sent has been properly validated by the secure device in the secure location.

Some existing HSM management solutions enable a shared secret to be generated outside of a secure environment. HSM management systems may enable end-users to generate shared secrets using their own identity or information about the mobile device. A shared secret generated outside of the secure environment by a remote administrator may be vulnerable to exploitation if an attacker is able to access information used to generate the shared secret and decrypt or otherwise obtain the shared secret. One or more embodiments of the present invention facilitate the use of the doubly encrypted shared secrets that are generated and encrypted in the secure environment by a secure device and associated HSM. The shared secrets are not decrypted outside of the secure environment and are not stored in a decrypted state on the mobile device. Accordingly, the shared secrets generated by the HSM of the secure device are protected outside of the secure environment as they are doubly encrypted and when loaded onto the mobile device and further encrypted when transmitted by the mobile device back to the secure device as part of an HSM command request for remotely managing HSMs, thus eliminating the vulnerabilities presented by existing HSM management solutions.

Figure 2:
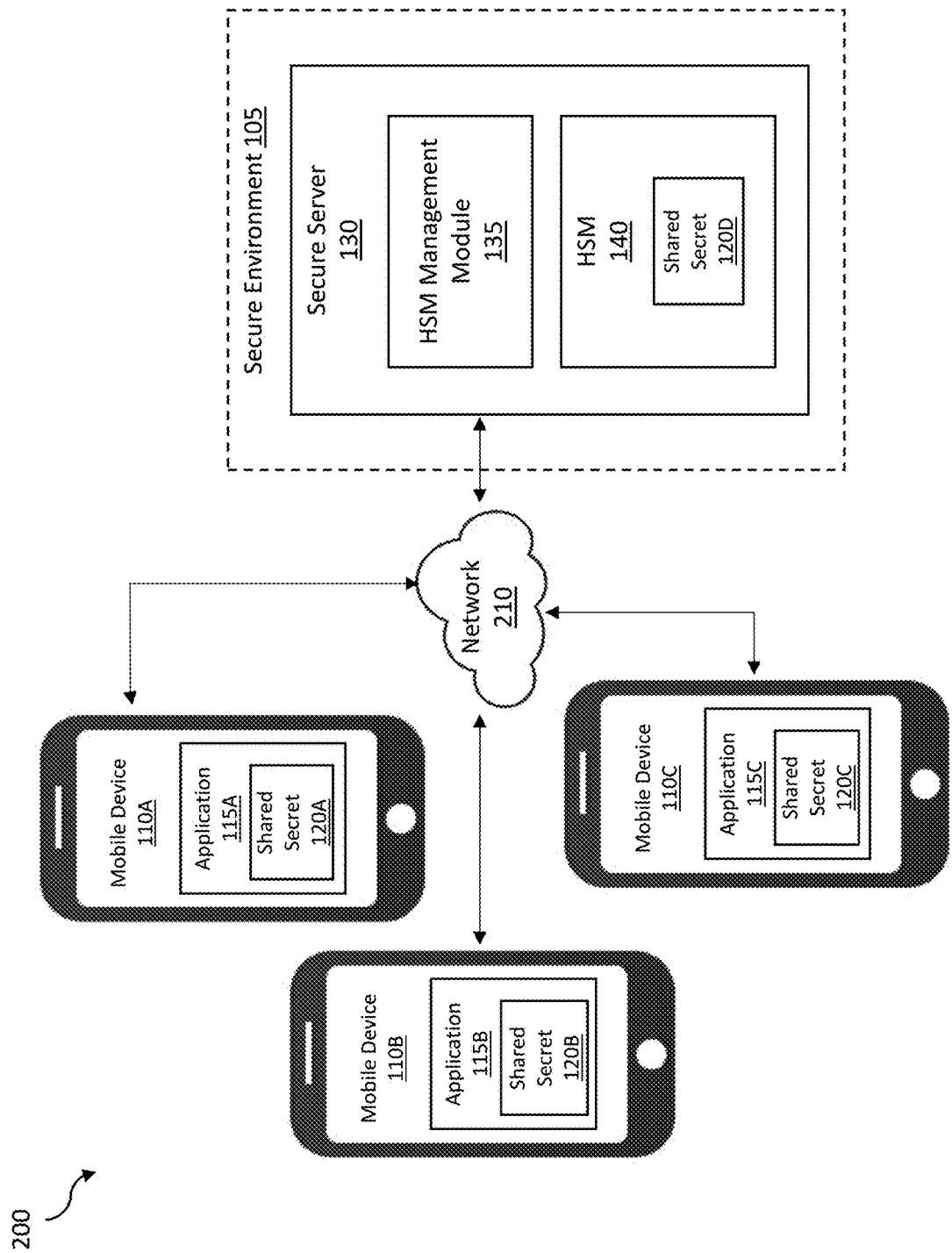
FIG. 2 is a schematic diagram illustrating remote management of hardware security modules in accordance with one or more example embodiments.

The following will provide, with references to FIGS. 1 and 2, detailed descriptions of example systems for remote management of HSMs. Detailed descriptions of corresponding computer-implemented methods will be provided in connection with FIGS. 3-5. In addition, detailed descriptions of an example computing system and network architecture for implementing one or more of the embodiments described herein will be provided in connection with FIG. 6.

FIG. 1 is a block diagram of an example system 100 for mobile device provisioning for remotely managing HSMs. As illustrated in this figure, example system 100 may include one or more modules for performing one or more tasks. As will be explained in greater detail below, the modules may include an HSM management module 135 of the secure server 130 and/or the application 115A, 115B, 115C of the respective mobile devices 110A, 110B, 110C. Although illustrated as separate elements, one or more of the modules in FIG. 1 may represent portions of a single module or application.

Referring now to FIG. 1, a system 100 configured in accordance with example embodiments of the invention includes a secure environment 105. The secure server 130 can be located in the secure environment 105. The secure environment 105 can be a secure location, such as a secure room or floor in a building of an organization or entity. The secure environment 105 can have limited or restricted access. As shown in the embodiment in FIG. 1, the secure server 130 includes an HSM management module 135 and an HSM 140. In one or more other embodiments of the present invention, the HSM 140 is connected to or attached to the secure server 130.

In some embodiments, setting up or configuring the secure server 130 can include the HSM management module 135 creating paths to one or more target HSMs. The HSM management module 135 can execute and/or manage an application, such as a web application, used to communicate with mobile devices (e.g., 110A, 110B, 110C) that have been provisioned and are used from outside the secure environment 105 to remotely manage one or more target HSMs. Additionally, the secure server 130 can be enrolled in a security zone. A security zone is designated by a certificate authority (CA) and can represent an entity or organization that issues and/or manages the certificate. In some embodiments a CA smart card, a CA certificate, or the like can define a security zone. The CA certificates can cryptographically link devices (e.g., mobile devices 110A, 110B, 110C, secure server 130, etc.).

In some embodiments, the HSM management module 135 can facilitate the generation and management of shared secrets 120A, 120B, 120C, 120D. The HSM management module 135 can facilitate the generation and management of shared secrets 120A, 120B, 120C, 120D by the HSM 140. Examples of the shared secrets 120A, 120B, 120C, 120D can include remote administrator profile logon keys, CCA normal mode signing keys, CCA PCI mode signing keys, EP11 signing keys, and/or key parts. The CCA normal signing keys can be asymmetric keys not subject to payment card industry (PCI) constraints. CCA PCI mode signing keys can be asymmetric keys that are compliant with PCI rules. EP11 signing keys can be asymmetric keys which adhere to PKCS#11 Public Key Cryptographic API interface to cryptographic tokens. The HSM management module 135 can facilitate splitting, dividing, or otherwise breaking down the master key of a target HSM into different key parts and assigning the key parts to different remote administrators. Each mobile device 110A, 110B, 110C has different shared secrets 120A, 120B, 120C (e.g., key parts, signing key, etc.) that can be encrypted by the public key of the CA certificate defining the security zone and a respective public key of a respective remote administrator profile associated with each respective remote administrator. The HSM management module 135 can generate and store the encrypted shared secrets 120D that are distributed to the mobile devices 110A, 110B, 110C to be used for remotely managing HSMs.

The HSM management module 135 of the secure server 130 can prepare the shared secrets 120D so they can be loaded to the mobile devices 110A, 110B, 110C after they are provisioned and assigned to a specific remote administrator. The HSM management module 135 can encrypt the shared secrets 120D (e.g., key part, signing key, remote administrator logon key, etc.) with the public key of the CA certificate defining the security zone. The HSM management module 135 can encrypt the shared secrets with the public key of certificate of the profile of the remote administrator. In some embodiments, the HSM management module 135 can set a maximum download count to restrict the number of times the shared secrets 120D can be downloaded for a mobile device 110A, 110B, 110C within a time period.

The mobile devices 110A, 110B, 110C are provisioned in the secure environment 105. In some embodiments, each mobile device is directly connected to the secure server 130. For example, a mobile device 110A can be connected to the secure server 130 through a direct connection 150, such as a Universal Serial Bus (USB) connection. In some embodiments, the mobile device 110A can be provisioned by installing a memory card with the necessary data in the mobile device 110A, scanning a QR code by the mobile device 110A, using a short range wireless technology, such as Bluetooth™ or Near Field Communication (NFC), or similar technology.

In some embodiments, the mobile device 110A is enrolled in a security zone. The mobile device 110A can be enrolled in the security zone by downloading a CA certificate that defines the security zone. The security zone indicates an affiliation of a device with an entity or organization that manages and/or issues the CA certificates. The mobile device 110A can be assigned to a remote administrator. In some embodiments, the mobile device 110A is assigned to a remote administrator by loading a remote administrator profile logon key shared secret onto the mobile device 110A, which can be a public key of a certificate of the remote administrator profile stored on the HSM 140 of the secure server 130.

In some embodiments, an application 115A, 115B, 115C for installation on a provisioned mobile device 110A, 110B, 110C can be stored on the secure server 130 and transferred to the mobile device 110A, 110B, 110C during the provisioning. In some embodiments, the application 115A, 115B, 115C can be available for download from an application distribution platform, such as an app store or app marketplace. The application 115A, 115B, 115C can be used by the mobile device 110A, 110B, 110C to establish a secure connection to the secure server 130 to communicate with the secure server 130 to remotely manage one or more HSMs. If the mobile device 110A, 110B, 110C downloads the application 115A, 115B, 115C from an application distribution platform, the mobile device 110A, 110B, 110C provisioning can be done in a separate step in the secure environment 105. The application 115A, 115B, 115C on the mobile device 110A, 110B, 110C can be PIN protected by a PIN set by the remote administrator the first time the application is executed. Additionally, the provisioned mobile device 110A, 110B, 110C can be protected by a different PIN set by the remote administrator. The mobile device PIN can be required to conform to one or more security policies determined by an administrator of the system 100. In some embodiments, the application 115A, 115B, 115C can store the shared secrets 120A, 120B, 120C generated and encrypted by the HSM 140 and transferred to the respective mobile devices 110A, 110B, 110C, during provisioning. In some embodiments, the shared secrets 120A, 120B, 120C can include different key parts assigned to the respective mobile devices 110A, 110B, 110C, that are combined to form a master key to access and manage an HSM. In some embodiments, the shared secrets 120A, 120B, 120C can be loaded onto the mobile devices 110A, 110B, 110C during provisioning while in the secure environment 105. The shared secrets 120D can be transmitted securely to the mobile devices 110A, 110B, 110C after the mobile devices have been provisioned while in the secure environment 105 and subsequently transported outside of the secure environment 105.

In some embodiments, the mobile devices 110A, 110B, 110C are provisioned in the secure environment 105 and can be sent to the remote administrator outside of the secure environment 105 and/or transported out of the secure environment 105 and physically delivered to the respective remote administrators.

The embodiments described herein with respect to system 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 2 is a block diagram of an example system 200 for remotely managing HSMs. As illustrated in this figure, example system 200 may include one or more modules for performing one or more tasks. As will be explained in greater detail below, the modules may include an HSM management module 135 of the secure server 130 and/or the application 115A, 115B, 115C executing on the respective mobile devices 110A, 110B, 110C. Although illustrated as separate elements, one or more of the modules in FIG. 1 may represent portions of a single module or application.

Figure 3:
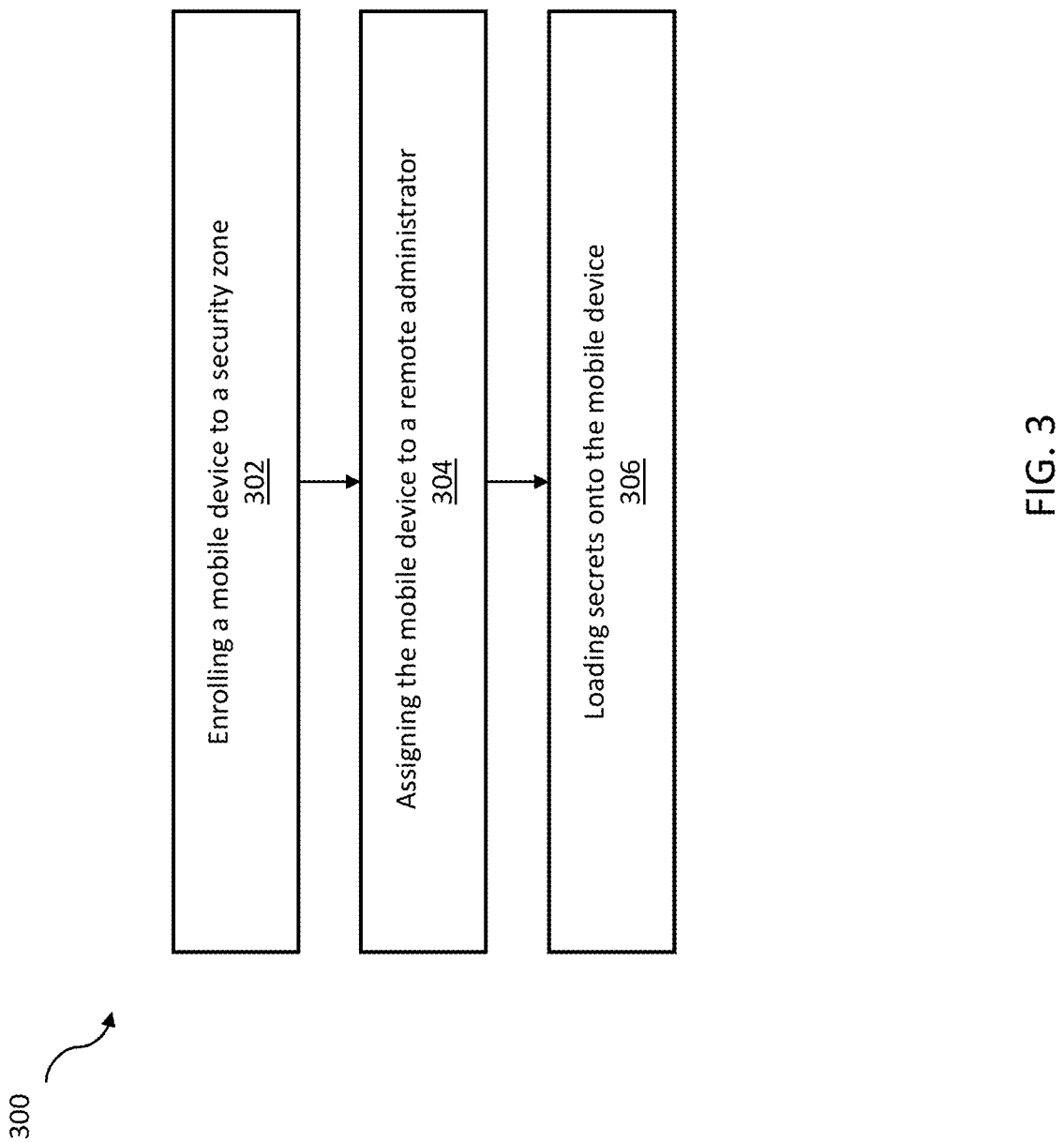
FIG. 3 is a process flow diagram of an illustrative method for provisioning mobile devices for remote management of hardware security modules in accordance with one or more example embodiments.

After the mobile devices 110A, 110B, 110C have been provisioned, as described in FIG. 1 and in further detail in FIG. 3, they can be remoted from the secure environment 105 and used by their assigned remote administrators from outside of the secure environment 105 to remotely manage HSMs. The applications 115A, 115B, 115C loaded onto the respective mobile devices 110A, 110B, 110C can be used to securely store their respective shared secrets 120A, 120B, 120C, which were loaded onto their respective devices during the provisioning or after provisioning was complete. In some examples, the remote administrators of the mobile devices 110A, 110B, 110C can execute their respective applications 115A, 115B, 115C to establish a secure connection over a network 210 with the secure server 130 located in the secure environment 105. For example, the remote administrator of mobile device 110A can use application the 115A to select parameters (e.g., domain to configure, selection of the shared secret 120A, selection of command, etc.) to generate an HSM command request for execution on an HSM of a designated domain. The application 115A can encrypt the HSM command request and securely transmit the command request to the HSM management module 135 of the secure server 130.

The HSM management module 135 can receive one or more HSM command requests from mobile devices 110A, 110B, 110C and process them. In some embodiments, the HSM management module 135 can validate the received HSM command requests received from the mobile device 110A, 110B, 110C. In some examples, the HSM management module 135 can direct the HSM 140 to decrypt the encrypted requests and/or decrypt the shared secrets 120A, 120B, 120C received from the mobile devices 110A, 110B, 110C. The HSM 140 can decrypt the encrypted requests and/or decrypt the shared secrets 120A, 120B, 120C using a corresponding shared secret 120D stored in the HSM 140. The HSM management module 135 can then build the HSM command based on the received HSM command request and transmit the command to the designated domain for execution by a target HSM, as designated in the HSM command request.

The designated domain (not pictured) can receive the commands from the HSM management module 135. The HSM management module 135 can transmit multiple commands from the respective mobile devices 110A, 110B, 110C. The target HSM of the designated domain can obtain the shared secrets 120A, 120B, 120C from the different commands received from the HSM management module 135 and can add the shared secrets 120A, 120B, 120C to a register inside the target HSM until a master key is formed. In some examples, the target HSM can perform a logical operation (e.g., XOR) or other means of combining data, to assemble the shared secrets 120A, 120B, 120C (e.g., key parts) received from the different commands received from the HSM management module 135 to produce a master key, which can be used to execute the command received from the HSM management module 135. Upon completion of the execution of the command by the target HSM of the designated domain, the results are transmitted back to the HSM management module 135. The HSM management module 135 can receive the results and generate a message to the respective mobile devices 110A, 110B, 110C indicating the results of the command executed by the target HSM.

The embodiments described herein with respect to system 200 of FIG. 2 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Now referring to FIG. 3, the system 100, configured in accordance with example embodiments of the invention, provisions one or more mobile devices 110A, 110B, 110C. All or a portion of the processing described in reference to FIG. 3 can be performed by the secure server 130 in a secure environment 105 of FIG. 1 to provision one or more mobile devices 110A, 110B, 110C. The mobile devices 110A, 110B, 110C are provisioned one at a time, in the secure environment 105. The mobile devices 110A, 110B, 110C can be provisioned by connecting the mobile device 110A, 110B, 110C (one at a time) with the secure server 130 using the direct connection 150, such as using a USB connection, scanning a QR code, using NFC technology or Bluetooth™ or the like.

At block 302, the method 300 for provisioning the mobile devices includes enrolling the mobile devices 110A, 110B, 110C to a security zone. In some embodiments, a mobile device 110A is enrolled in the security zone by downloading a CA certificate that defines the security zone on the mobile device 110A. The CA certificate indicates an affiliation of a device, such as mobile device 110A, with an entity or organization that manages and/or issues the CA certificates.

At block 304, the method 300 for provisioning the mobile device includes assigning a mobile device 110A to a remote administrator. In some embodiments, the HSM management module 135 can define or identify users and assign them to a remote administrative profile. In some embodiments, the remote administrative profiles can be stored as a set of remote administrator profile objects. In some embodiments, the remote administrative profile objects can be stored or contained on the HSM 140 of the secure server 130. The remote administrative profile objects can contain a remote administrative profile certificate and a private key corresponding to the public key in the remote administrator profile's certificate. In some embodiments, the mobile device 110A is assigned to a remote administrator by loading a remote administrator profile logon key secret.

At block 306, the method 300 for provisioning the mobile device includes loading the shared secrets 120A onto the mobile device 110A. In some embodiments, the shared secrets 120A are loaded onto the mobile device 110A during the provisioning. In some embodiments, a user can request the secure server 130 to transmit shared secrets 120A (e.g., encrypted key parts, encrypted signing key, etc.) through the application 115A executing on the mobile device 110A. In some embodiments, the mobile device 110A can request new shared secrets 120A generated for that specific remote administrator through the application 115A executing on the mobile device 110A. The new shared secrets 120A can be encrypted and transmitted by the secure server 130 to the mobile device 110A. This method can be repeated for each mobile device. For example, blocks 302 to 306 can be repeated with mobile device 110B by connecting the mobile device 110B to the secure server 130 using a direct connection 150, provisioning the mobile device 110B, downloading the application 115B and loading the shared secrets 120B generated and encrypted for mobile device 110B. Blocks 302 to 306 can be repeated with mobile device 110C by connecting the mobile device 110C to the secure server 130 using a direct connection 150, provisioning mobile device 110C, downloading the application 115C and loading the shared secrets 120C generated and encrypted for mobile device 110C. Each mobile device 110A, 110B, 110C is provisioned by itself because the shared secrets 120A, 120B, 120C correspond to their respective mobile devices 110A, 110B, 110C.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
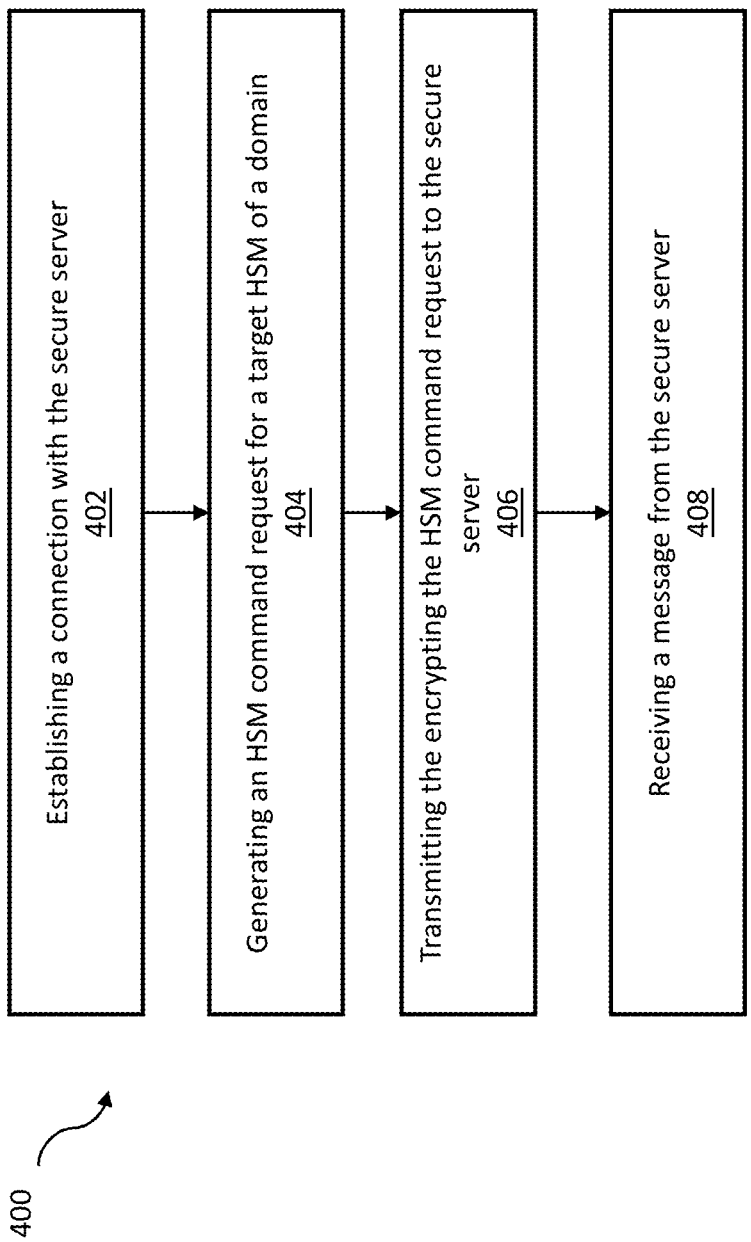
FIG. 4 is a process flow diagram of an illustrative method for remote management of hardware security modules by a mobile device in accordance with one or more example embodiments.

Now referring to FIG. 4, at block 402 of the method 400, a system 200 configured in accordance with example embodiments of the invention establishes a connection with the secure server 130. All or a portion of the processing described in reference to FIG. 4 can be performed by a mobile device 110A, 110B, 110C, typically located outside of the secure environment 105 of FIG. 2, to remotely manage HSMs. In some examples, the application 115A of mobile device 110A establishes a connection with the secure server 130 over one or more networks 210. The remote administrator can open the application 115A on the mobile device 110A. The application 115A on the mobile device 110A can be protected by a PIN set by the remote administrator the first time the application 115A is opened. In some embodiments, the remote administrator can specify a web address to access the web application executing on the secure server 130. The remote administrator authenticates to the application 115A executing on the mobile device 110A, such as through a multi-factor authentication challenge.

At block 404 of method 400, the computer-executable instructions of the application 115A executing on the mobile device 110A generates an HSM command request for a target HSM of a domain. The application 115A facilitates selection of a target HSM to be configured from a list of available HSMs by the remote administrator. The remote administrator can select a command for execution on the target HSM, such as a LOADKEY command, and select the shared secrets 120A needed for execution of the command on the target HSM. The shared secrets 120A of mobile device 110A can include the encrypted key part, encrypted signing key, and/or the encrypted logon key secret associated with the profile of the remote administrator, loaded during the provisioning of the mobile device 110A and/or after the mobile device 110A was provisioned. The application 115A can generate the HSM command request for the target HSM of the designated domain using the selections of the remote administrator.

At block 406 of method 400, the computer-executable instructions of the application 115A executing on the mobile device 110A encrypts the HSM command request. In some embodiments, the application 115A encrypts the HSM command request with the public key of the CA certificate defining the security zone. The application 115A transmits the encrypted HSM command request to the secure server 130 executing in the secure environment 105. In some examples, the application 115A transmits the encrypted HSM command request to the HSM management module 135 of the secure server 130.

At block 408 of method 400, the computer-executable instructions of the application 115A receives a message from the secure server 130. For example, the message can include results of the HSM command executed on the target HSM of the designated domain. In some examples, the message can display a positive or negative statement indicating the success or failure of the execution of the HSM command executed on the target HSM of the designated domains.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
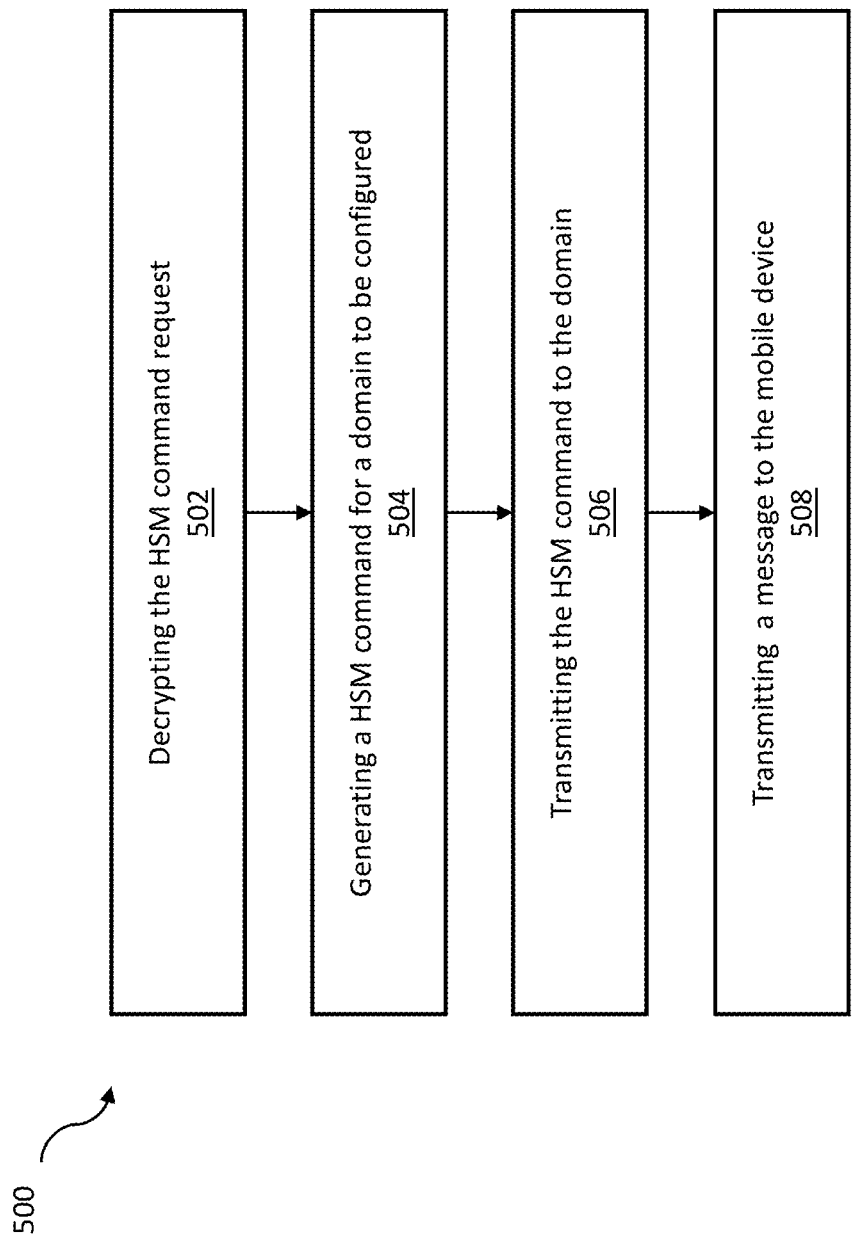
FIG. 5 is a process flow diagram of an illustrative method for remote management of hardware security modules by a secure server in accordance with one or more example embodiments.

Now referring to FIG. 5, at block 502 of the method 500, a system 200, configured in accordance with example embodiments of the invention, decrypts the HSM command request received from a mobile device, such as 110A, 110B, or 110C. The HSM management module 135 can receive the encrypted HSM command request over the connection established by the respective application 115A, 115B, 115C executing on the mobile device 110A, 110B, 110C, as described in FIG. 3. The HSM management module 135 can facilitate decrypting the received request from the mobile device 110A, 110B, 110C by the HSM 140. For example, the HSM 140 can decrypt the received HSM command request using a private key corresponding to the public key of the CA certificate that defines the security zone. The HSM management module 135 can facilitate decryption of the shared secrets 120A, 120B, 120C received in the decrypted request. The HSM 140 can decrypt, for example, the key part, the signing key, and/or the logon key associated with the profile of the remote administrator, each of which can be independently encrypted from each other and doubly encrypted using a public key of the CA certificate defining the security zone and the public key of a CA certificate of a profile of the remote administrator. The HSM 140, under the direction of the HSM management module 135, can decrypt the shared secrets 120A, 120B, 120C of the HSM command request received from the mobile device 110A, 110B, 110C using a corresponding shared secret 120D stored on the HSM, such as a private key corresponding to the public key of the CA certificate defining the security zone. The HSM 140 can decrypt the shared secrets 120A, 120B, 120C of the HSM command request received from the mobile device 110A, 110B, 110C using a shared secret 120D, such as a private key corresponding to the public key of the CA certificate of the profile of the remote administrator.

At block 504 of method 500, the computer-executable instructions of the HSM management module 135, executing on the secure server 130, generates an HSM command for a domain to be configured. The HSM command is generated based on the HSM command request received from the mobile device 110A. The HSM command includes the key part assigned to the remote administrator that has been decrypted by the HSM 140. The HSM command can include the domain to be configured as designated by the remote administrator when the HSM command request was generated. The HSM command can be generated for execution by a target HSM of the domain to be configured.

At block 506 of method 500, the computer-executable instructions of the HSM management module 135, executing on the secure server 130, transmits the HSM command to the domain. In some embodiments, the key part assigned to the remote administrator can be wrapped with a transport key negotiated between the target HSM being configured and the secure server 130.

At block 508 of method 500, the computer-executable instructions of the HSM management module 135 executing on the secure server 130 transmits a message to the mobile device 110A, 110B, 110C that transmitted the HSM command request. In some embodiments, the message is generated responsive to receiving the results of executing the HSM command by the target HSM of the domain being configured. The results of the target HSM are transmitted to the HSM management module 135 of the secure server 130 and the message to the mobile device contains a positive or negative indication based on the results received from the target HSM of the domain being configured.

In some embodiments, the secure server 130 receives the encrypted requests from the different mobile devices 110A, 110B, 110C associated with the respective assigned remote administrators. The HSM management module 135 of the secure server 130 validates the requests and builds HSM commands using information from the respective requests received from the mobile devices 110A, 110B, 110C of the remote administrators. Each HSM command is signed using a signing key obtained from a respective request and transmitted to the domain designated by the respective request. The command is executed by a target HSM of the designated domain. The target HSM will receive HSM commands based on HSM command requests received by the secure server 130 from all designated remote administrators. The target HSM of the designated domain assembles the key parts from each of the remote administrators until a master key is formed using the collected key parts. In some examples, the key parts from each of the commands received by the target HSM are added to a register inside the target HSM. The key parts stored on the register of the target HSM can be combined using a logical operation (e.g., XOR) or other means of combining data to produce a master key. The HSM command is executed by the target HSM upon completion or formation of the master key. The results of the command executed by the target HSM are transmitted back to the HSM management module 135. The HSM management module 135 generates a message indicative of the results received from the domain and transmits the message to the respective mobile device 110A, 110B, 110C.

In some embodiments, the HSM management module 135 executing on the secure server 130 detects unusual or unauthorized access by a mobile device of a remote administrator. For example, the HSM management module 135 receives multiple invalid requests from the same IP address. The HSM management module 135 identifies the mobile device 110A, 110B, 110C associated with the IP address and determines that the number of invalid requests exceeds a specified threshold. The mobile device 110A, 110B, 110C can be added to a restricted list or a deny list. In some examples, the mobile device 110A, 110B, 110C is added to the list for a specified time period (e.g., 1 hour). In some embodiments, the mobile device 110A, 110B, 110C is denied access to the secure server 130 until an administrator removes the mobile device 110A, 110B, 110C from the restricted list or deny list. In some embodiments, if the mobile device 110A, 110B, 110C is on the restricted or deny list, the mobile device 110A, 110B, 110C can be remotely erased or the certificate of the profile of the remote administrator is revoked, thereby removing access by the mobile device 110A, 110B, 110C to the secure server 130. In some embodiments, if the mobile device 110A, 110B, 110C is suspected of being compromised or infiltrated, the mobile device 110A, 110B, 110C can be remotely erased or the certificate of the profile of the remote administrator can be revoked by the HSM management module 135 based on one or more security policies or by an administrator of the system. If the mobile device 110A, 110B, 110C has been erased or the certificate of the profile of the remote administrator has been revoked, the mobile device 110A, 110B, 110C would need to be taken back to the secure environment 105 to be provisioned again or a new mobile device would need to be provisioned in the secure environment 105 for the remote administrator and delivered to the remote administrator for them to gain access to the secure server 130.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
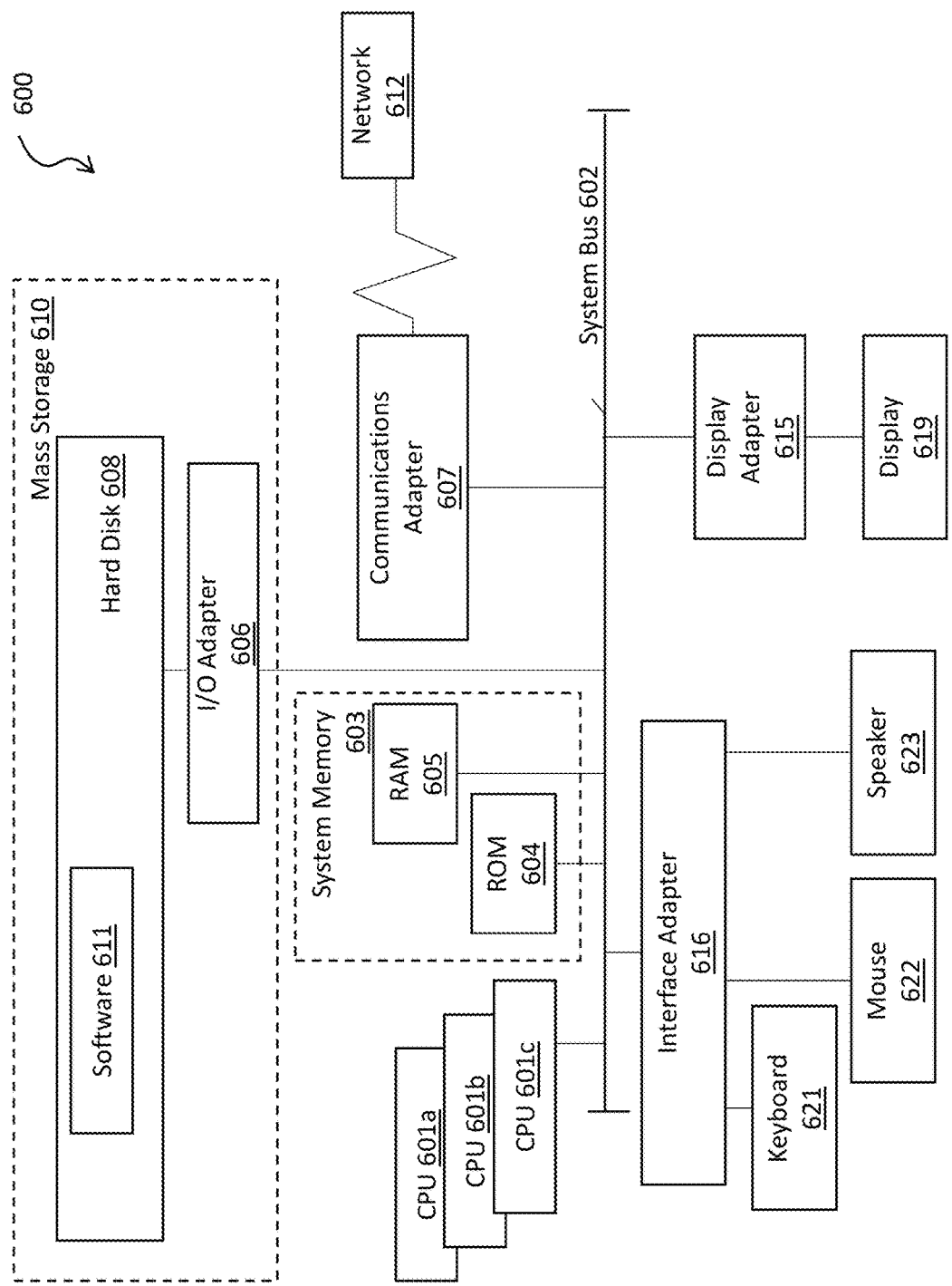
FIG. 6 is a computer system in accordance with one or more embodiments of the present invention.

Turning now to FIG. 6, a computer system 600 is generally shown in accordance with an embodiment of the present invention. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, the computer system 600 may be a cloud computing node. The computer system 600 may be described in the general context of computer system executable instructions, such as program modules, being executed by a computer system. Generally, program modules may include routines, programs, objects, components, logic, data structures, and so on that perform particular tasks or implement particular abstract data types. The computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random-access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

The software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method comprising:
   loading an encrypted key part from a hardware security module (HSM) to a mobile device, wherein the HSM and the mobile device are directly connected to one another in a secure environment during the loading, wherein the secure environment is a secure location where the HSM is located;
   receiving, by a processor of a computing device, a command request from the mobile device associated with a remote administrator, the command request comprising the encrypted key part and an encrypted signing key, wherein the command request is received when the mobile device is outside of the secure environment and connected to the secure server over a network;
   decrypting, by the HSM, the command request using a key associated with a security zone of the mobile device;
   decrypting, by the HSM, the encrypted key part and the encrypted signing key to generate a decrypted key part and a decrypted signing key, wherein decrypting the encrypted key part and the encrypted signing key comprises using the key associated with the security zone of the mobile device and a key associated with a remote administrator associated with the mobile device;
   generating, for a domain with a target HSM and based on the command request, a command using the decrypted key part and the decrypted signing key;
   signing the command using the decrypted signing key; and
   transmitting the command to the domain for execution by the target HSM, wherein the command is signed prior to transmitting to the domain for execution,
   wherein the HSM is in signal communication with a secure server enrolled in the security zone and wherein the command request further comprises an encrypted logon key associated with the remote administrator and the computer-implemented method further comprises:
      decrypting, by the HSM, the encrypted logon key to generate a decrypted logon key that corresponds to a public key of a CA certificate that defines the security zone by enrolling the mobile device using a downloaded CA certificate that associates the security zone with the remote administrator, wherein decrypting the encrypted logon key comprises using the key associated with the security zone of the mobile device and the key associated with the remote administrator associated with the mobile device; and
      transmitting the decrypted logon key with the command to the domain.

2. The computer-implemented method of claim 1, further comprising:
   receiving, by the processor of the computing device, a second command request from a second mobile device, the second command request comprising a second encrypted key part and a second encrypted signing key;
   decrypting, by the HSM, the second command request using the key associated with the security zone of the mobile device;
   decrypting, by the HSM, the second encrypted key part and the second encrypted signing key to generate a second decrypted key part and a second decrypted signing key, wherein decrypting the second encrypted key part and the second encrypted signing key comprises using the key associated with the security zone and a different key associated with a different remote administrator associated with the second mobile device;

generating, for the domain with the target HSM, a second command using the second decrypted key part and the second decrypted signing key; and transmitting the second command to the domain.

3. The computer-implemented method of claim 2, wherein the decrypted key part and the second decrypted key part are a part of a master key associated with the target HSM of the domain.

4. The computer-implemented method of claim 1, further comprising provisioning the mobile device by enrolling the mobile device in the securityzone and associating the mobile device with the remote administrator.

5. The computer-implemented method of claim 1, further comprising transmitting a message to the mobile device based on results received from the domain.

6. A system comprising:
one or more processors for executing computer-readable instructions, the computer-readable instructions controlling the one or more processors to perform operations comprising:
loading an encrypted key part from a hardware security module (HSM) to a mobile device, wherein the HSM and the mobile device are directly connected to one another in a secure environment during the loading, wherein the secure environment is a secure location where the HSM is located;
receiving a command request from the mobile device associated with a remote administrator, the command request comprising the encrypted key part and an encrypted signing key, wherein the command request is received when the mobile device is outside of the secure environment and connected to the secure server over a network;
decrypting, by the HSM, the command request using a key associated with a security zone of the mobile device;
decrypting, by the HSM, the encrypted key part and the encrypted signing key to generate a decrypted key part and a decrypted signing key, wherein decrypting the encrypted key part and the encrypted signing key comprises using the key associated with the security zone of the mobile device and a key associated with a remote administrator associated with the mobile device;
generating, for a domain with a target HSM and based on the command request, a command using the decrypted key part and the decrypted signing key;
signing the command using the decrypted signing key; and
transmitting the command to the domain for execution by the target HSM, wherein the command is signed prior to transmitting to the domain for execution,
wherein the HSM is in signal communication with a secure server enrolled in the security zone and wherein the command request further comprises an encrypted logon key associated with the remote administrator and the operations further comprise:
decrypting, by the HSM, the encrypted logon key to generate a decrypted logon key that corresponds to a public key of a CA certificate that defines the security zone, wherein decrypting the encrypted logon key comprises using the key associated with the security zone of the mobile device and the key associated with the remote administrator associated with the mobile device; and
transmitting the decrypted logon key with the command to the domain.

7. The system of claim 6, wherein the operations further comprise:
receiving a second command request from a second mobile device, the second command request comprising a second encrypted key part and a second encrypted signing key;
decrypting, by the HSM, the second command request using the key associated with the security zone of the mobile device;
decrypting, by the HSM, the second encrypted key part and the second encrypted signing key to generate a second decrypted key part and a second decrypted signing key, wherein decrypting the second encrypted key part and the second encrypted signing key comprises using the key associated with the security zone and a different key associated with a different remote administrator associated with the second mobile device;
generating, for the domain with the target HSM, a second command using the second decrypted key part and the second decrypted signing key; and
transmitting the second command to the domain.

8. The system of claim 7, wherein the decrypted key part and the second decrypted key part are a part of a master key associated with the target HSM of the domain.

9. The system of claim 6, wherein the operations further comprise provisioning the mobile device by enrolling the mobile device in the securityzone and associating the mobile device with the remote administrator.

10. The system of claim 6, wherein the operations further comprise transmitting a message to the mobile device based on results received from the domain.

11. A computer program product comprising a computer-readable storage medium having program instructions embodied therewith, the program instructions executable by one or more processors to cause the one or more processors to perform operations comprising:
loading an encrypted key part from a hardware security module (HSM) to a mobile device, wherein the HSM and the mobile device are directly connected to one another in a secure environment during the loading, wherein the secure environment is a secure location where the HSM is located;
receiving a command request from the mobile device associated with a remote administrator, the command request comprising the encrypted key part and an encrypted signing key, wherein the command request is received when the mobile device is outside of the secure environment and connected to the secure server over a network;
decrypting, by the HSM, the command request using a key associated with a security zone of the mobile device;
decrypting, by the HSM, the encrypted key part and the encrypted signing key to generate a decrypted key part and a decrypted signing key, wherein decrypting the encrypted key part and the encrypted signing key comprises using the key associated with the security-zone of the mobile device and a key associated with a remote administrator associated with the mobile device;

generating, for a domain with a target HSM and based on the command request, a command using the decrypted key part and the decrypted signing key;

signing the command using the decrypted signing key; and transmitting the command to the domain for execution by the target HSM, wherein the command is signed prior to transmitting to the domain for execution, and wherein the HSM is in signal communication with a secure server enrolled in the security zone and wherein the command request further comprises an encrypted logon key associated with the remote administrator and the operations further comprising:

decrypting, by the HSM, the encrypted logon key to generate a decrypted logon key that corresponds to a public key of a CA certificate that defines the security zone, wherein decrypting the encrypted logon key comprises using the key associated with the security zone of the mobile device and the key associated with the remote administrator associated with the mobile device; and transmitting the decrypted logon key with the command to the domain.

12. The computer program product of claim 11, further comprising:

receiving a second command request from a second mobile device, the second command request comprising a second encrypted key part and a second encrypted signing key;

decrypting, by the HSM, the second command request using the key associated with the security zone of the mobile device;

decrypting, by the HSM, the second encrypted key part and the second encrypted signing key to generate a second decrypted key part and a second decrypted signing key, wherein decrypting the second encrypted key part and the second encrypted signing key comprises using the key associated with the securityzone and a different key associated with a different remote administrator associated with the second mobile device;

generating, for the domain with the target HSM, a second command using the second decrypted key part and the second decrypted signing key; and transmitting the second command to the domain.

13. The computer program product of claim 12, wherein the decrypted key part and the second decrypted key part are a part of a master key associated with the target HSM of the domain.

14. The computer program product of claim 11, further comprising provisioning the mobile device by enrolling the mobile device in the securityzone and associating the mobile device with the remote administrator.

15. The computer program product of claim 11, further comprising transmitting a message to the mobile device based on results received from the domain.

16. A computer-implemented method comprising:

loading an encrypted key part from a hardware security module (HSM) to a mobile device, wherein the HSM and the mobile device are directly connected to one another in a secure environment during the loading, wherein the secure environment is a secure location where the HSM is located;

receiving, by a processor of a computing device, from the mobile device associated with a remote administrator, a load key request comprising the encrypted key part and an encrypted signing key, wherein the load key request is received when the mobile device is outside of the secure environment and connected to the secure server over a network;

validating the load key request from the mobile device;

decrypting the encrypted key part and the encrypted signing key to generate a decrypted key part and a decrypted signing key, wherein decrypting the encrypted key part and the encrypted signing key comprise using a private key corresponding to a public key of a certificate authority (CA) certificate for a securityzone and a private key corresponding to a public key of a CA certificate of a profile of the remote administrator;

building a load key command for a domain designated by the load key request, wherein the load key command comprises the decrypted key part and is signed using the decrypted signing key; and transmitting the load key command to the domain for execution by the HSM, wherein the load key command is signed prior to transmitting to the domain for execution, wherein the HSM is in signal communication with a secure server enrolled in the securityzone and wherein the load key request is encrypted using the public key of the CA certificate that defines the security zone and validating the load key request comprises decrypting the load key request using the private key corresponding to the public key of the CA certificate for the security zone.

17. A computer-implemented method comprising:

loading an encrypted key part from a hardware security module (HSM) to a mobile device, wherein the HSM and the mobile device are directly connected to one another in a secure environment during the loading, wherein the secure environment is a secure location where the HSM is located;

receiving, by a processor of a secure computing device from the mobile device associated with a remote administrator, an encrypted HSM command request comprising the encrypted key part and an encrypted signing key, wherein the encrypted HSM command request is received when the mobile device is outside of the secure environment and connected to a secure server enrolled in a securityzone over a network;

decrypting the encrypted HSM command request from the mobile device using a key associated with the security zone associated with the mobile device;

decrypting, by the HSM of the secure computing device, the encrypted key part and the encrypted signing key to generate a decrypted key part and a decrypted signing key;

generating an HSM command corresponding to the encrypted HSM command request for a designated domain, based at least in part on the decrypted key part and the decrypted signing key; and transmitting the HSM command to the designated domain for execution by a target HSM of the designated domain, wherein the HSM command is signed prior to transmitting to the designated domain, wherein the HSM is in signal communication with the secure server enrolled in the securityzone and wherein the encrypted HSM command request further comprises an encrypted logon key associated with the remote administrator, and wherein the computer-implemented method further comprises:

decrypting, by the HSM, the encrypted logon key to generate a decrypted logon key that corresponds to a public key of a CA certificate that defines the security zone by enrolling the mobile device using a downloaded CA certificate that associates the security zone with the remote administrator, wherein decrypting the encrypted logon key comprises using the key associated with the security zone of the mobile device and the key associated with the remote administrator associated with the mobile device; and transmitting the decrypted logon key with the encrypted HSM command to the designated domain.

18. The computer-implemented method of claim 17, further comprising transmitting a message to the mobile device based on results received from the designated domain.

* * * * *